United States Patent [19]

Demin

[11] Patent Number: 5,252,809
[45] Date of Patent: Oct. 12, 1993

[54] PANEL HEATING ELEMENT AND PROCESS FOR ITS PRODUCTION

[75] Inventor: Oleg Demin, Moskau, U.S.S.R.

[73] Assignee: Lapin-Demin GmbH, Sechshelden, Fed. Rep. of Germany

[21] Appl. No.: 767,322

[22] Filed: Sep. 30, 1991

[30] Foreign Application Priority Data

Feb. 26, 1991 [EP] European Pat. Off. ..... 91/102.800.9

[51] Int. Cl.⁵ .......................... H05B 3/16; H05B 3/68
[52] U.S. Cl. ................................. 219/543; 219/464; 219/443; 219/468
[58] Field of Search ............... 219/543, 464, 443, 468; 252/500, 518; 501/46, 47

[56] References Cited

U.S. PATENT DOCUMENTS

| | | | |
|---|---|---|---|
| 2,950,996 | 12/1957 | Place, Sr. et al. | 338/333 |
| 3,781,523 | 12/1973 | Borom | 219/462 |
| 3,924,221 | 12/1975 | Winkler | 338/308 |
| 3,948,812 | 4/1976 | Corren | 252/512 |
| 3,978,316 | 8/1976 | Rose et al. | 219/438 |
| 4,016,525 | 5/1977 | Maher et al. | 338/309 |
| 4,278,725 | 7/1981 | Riley et al. | 428/208 |
| 4,536,328 | 8/1985 | Hankey | 252/518 |
| 4,713,530 | 12/1987 | Schittenhelm et al. | 219/543 |
| 4,843,218 | 6/1989 | Husslein et al. | 219/468 |
| 4,849,605 | 7/1989 | Nakamori et al. | 346/76 PH |
| 4,857,384 | 8/1989 | Mio et al. | 428/164 |
| 4,960,978 | 10/1990 | Lorenz et al. | 219/455 |
| 4,961,999 | 10/1990 | Hormadaly | 428/427 |
| 4,973,826 | 11/1990 | Baundry et al. | 338/306 |
| 4,999,049 | 3/1991 | Balderson et al. | 219/553 |

FOREIGN PATENT DOCUMENTS

| | | |
|---|---|---|
| 0222162 | 5/1987 | European Pat. Off. . |
| 0319079 | 6/1989 | European Pat. Off. . |
| 227853 | 9/1985 | Fed. Rep. of Germany . |
| 227854 | 9/1985 | Fed. Rep. of Germany . |
| 3545267 | 6/1987 | Fed. Rep. of Germany . |

Primary Examiner—Bruce A. Reynolds
Assistant Examiner—Michael D. Switzer
Attorney, Agent, or Firm—Sixbey, Friedman, Leedom & Ferguson

[57] ABSTRACT

A panel heating element, especially for thermal home appliances, with a laminar support element (1) for supporting all items to be heated and an electrically conductive heating layer (2) applied laminarly to support element (1), the heating layer (2) containing glass and being applied in a pasty state. The panel heating element makes possible a relatively high surface-specific heating power and relatively high heating temperatures and, moreover, is relatively inexpensive in that the heating layer (2) in pasty state consists of powdered molybdenum boride, of two different powdered types of glass and of an organic substance, and, in the preferred embodiment, an insulating layer (3) is provided between the support element (1) and the heating layer (2), and the heating layer (2) is provided with a protective layer (4) on a side that faces away from support element (1).

16 Claims, 1 Drawing Sheet

U.S. Patent
Oct. 12, 1993
5,252,809
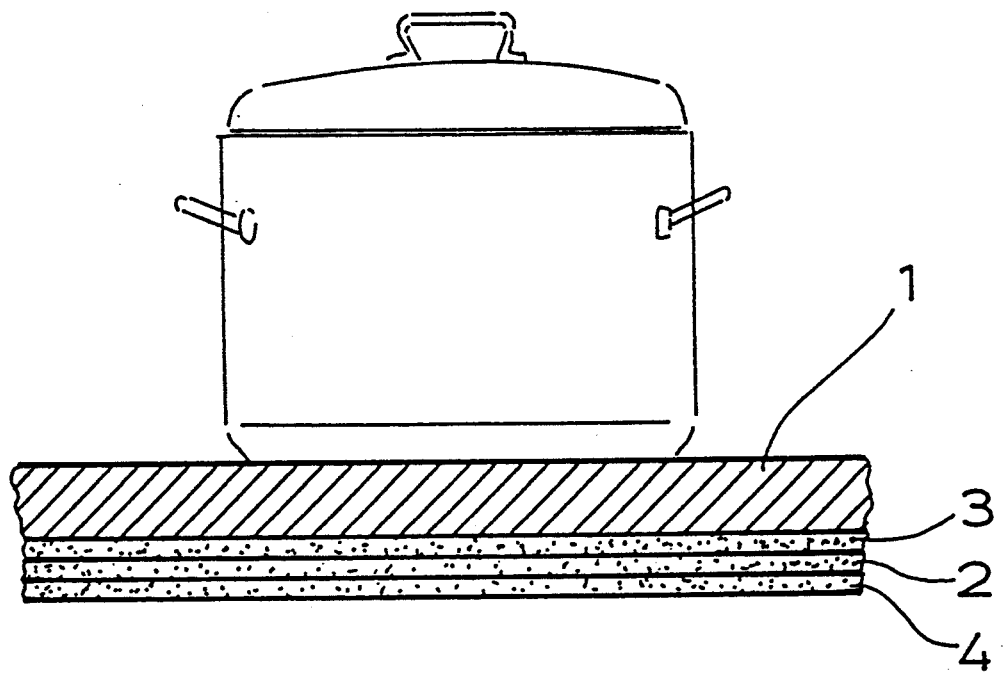

PANEL HEATING ELEMENT AND PROCESS FOR ITS PRODUCTION

BACKGROUND OF THE INVENTION

The invention relates to a panel heating element, especially for thermal home appliances, with a laminar support element and a electrically conductive heating layer applied laminarly to the support element, in which the heating layer contains glass and is applied in a pasty state, and a process for the production of such a panel heating element.

Panel heating elements of the type under discussion are widely known and especially recently have been the object of extensive development work (cf. German laid-open specifications 35 45 267 and 35 45 442, GDR patent specification 227 853 and 227 954 as well as European laid-open specifications 0 222 162, 0 319 079 and 0 381 792). It is common to all known panel heating elements that they allow only a relatively low surface-specific heating power and only relatively low heating temperatures, moreover they are relatively expensive.

SUMMARY OF THE INVENTION

The invention is based on the following object: to provide a panel heating element of the type under discussion, that makes possible a relatively high surface-specific heating power and relatively high heating temperatures and, moreover, is relatively inexpensive to produce.

The panel heating element according to the invention, with which and in which the above-indicated object is achieved, utilizes a heating layer that, in the pasty state in which it is applied, comprises one of the powdered molybdenum borides, namely $Mo_2B_5$, $MoB$, $Mo_2B$, two different powdered types of glass and, preferably, an organic substance.

Basically, in the panel heating element according to the invention, the laminar support element can consist of electrically nonconductive material. Then, the electrically conductive heating layer can be applied directly to the support element. But generally the laminar support element consists of electrically conductive material, e.g., of high-grade steel or glass ceramic, which does have a low electrical conductivity at room temperature, but whose electrical conductivity increases with increasing temperature. If, in the panel heating element according to the invention, the laminar support element consists of electrically conductive material, especially of high-grade steel or glass ceramic, then an insulating layer is provided between the support element and heating layer. Finally, it is advisable to provide the heating layer with a protective layer on the side which faces away from the support element.

In particular, there are various possibilities for configuring and further developing the teaching of the invention, which applies especially in relation to the composition of the heating layer in detail, but also in relation to the composition of the insulating layer and the protective layer and is to be shown by example below.

First, in the panel heating element according to the invention, the heating layer, preferably, consists of 4.0 to 80.0% of molybdenum boride, 9.0 to 48.0% of a first type of glass, 1.0 to 23.0% of a second type of glass and 10.0 to 25.0% of an organic substance. (The percentages relate here and below always to portions by weight relative to the total weight).

Especially important is the further teaching that the first type of glass has a softening temperature not exceeding 700° C. and preferably consists of 23.0 to 42.0% of silicon oxide ($SiO_2$), 1.6 to 8.0% of aluminum oxide ($Al_2O_3$), 13.0 to 29% of boron oxide ($B_2O_3$), 5.0 to 16.0% of bismuth oxide ($Bi_2O_3$), 1.5 to 7.5% of calcium oxide (CaO), 25.0 to 43.0% of barium oxide (BaO) and 1.0 to 11.3% of zinc oxide (ZnO) and/or that the second type of glass is crystallized, has an incipient crystallization temperature not exceeding 820° C., and preferably, consists of 16.0 to 25.0% of silicon oxide ($SiO_2$), 5.0 to 25% of boron oxide ($B_2O_3$), 3.0 to 10.0% of calcium oxide (CaO), 15.0 to 30.0% of magnesium oxide (MgO), 10.0 to 35.0% of barium oxide (BaO), 0.5 to 5.0% of titanium oxide ($TiO_2$), 0.1 to 3.0% of manganese oxide ($Mn_2O_3$), 0.1 to 5.0% of phosphorus oxide ($P_2O_5$), 0.1 to 12.0% of zirconium oxide ($ZrO_2$) and 2.0 to 6.0% of aluminum oxide ($Al_2O_3$).

In the panel heating element according to the invention, a mixture of lanolin, petrolatum oil and optionally cyclohexanol, preferably of 15 parts of lanolin, 3 parts of petrolatum oil and one part of cyclohexanol is used as the organic substance.

If in the panel heating element according to the invention, as shown above, besides the heating layer, has an insulating layer and/or a protective layer, the insulating layer or protective layer can be made in different ways. In regard to the insulating layer, a further teaching of the invention is that the layer consists of a powdered second type of glass and an organic substance in a pasty state. Preferably, the layer is formed of 70.0 to 90.0% of the second type of glass and 10.0 to 30.0% of the organic substance, the organic substance preferably consists of 25.0 to 60.0% of lanolin and 40.0 to 75.0% of petrolatum oil. The protective layer preferably consists, in a pasty state, of the two powdered types of glass and of the organic substance, which is also a component of the heating layer, preferably of 10.0 to 89.0% of the first type of glass, 1.0 to 60.0% of the second type of glass and 10.0 to 30.0% of the organic substance.

The object of the invention, as initially stated, is also a process for the production of a panel heating element with a laminar support element and an electrically conductive heating layer applied laminarly to the support element, and the heating layer contains glass and is applied in pasty state, especially to a process for the production of the above-described panel heating element according to the invention. In this case, the process according to the invention first and basically is characterized in that the heating layer and, optionally, the insulating layer and the protective layer is/are applied in pasty state via a silk-screening process. Afterwards, the heating layer and, optionally, the insulating layer and the protective layer is/are baked, namely at a temperature of about 820° to 875° C., preferably of about 850° C. In particular, it is advisable first to apply and bake a first partial layer of the insulating layer, then apply and bake second, third and, optionally, a fourth partial layer of the insulating layer, then to apply and bake the heating layer, and finally, to apply and bake the protective layer.

Molybdenum boride in the panel heating element according to the invention is the material that gives the heating layer the electrical conductivity. Since the first type of glass begins to soften starting from 700° C., the molybdenum boride is protected from an undesirable air supply. So that the first type of glass does not completely melt with increasing temperature, a protective skeleton is incorporated by the second type of glass.

The use of the second type of glass for the insulating layer and the use of the first and second types of glass for the protective layer is advantageous since these types of glass, with respect to the relevant properties, particularly the coefficients of thermal expansion and the chemical inertness, are especially matched to the molybdenum boride.

These and further objects, features and advantages of the present invention will become apparent from the following description when taken in connection with the accompanying drawings which show, for purposes of illustration only, a single embodiment in accordance with the present invention.

BRIEF DESCRIPTION OF THE DRAWINGS

The sole FIGURE is a cross-sectional view of a portion of a panel heating element in accordance with a preferred embodiment.

DETAILED DESCRIPTION OF THE PREFERRED EMBODIMENT

The single FIGURE of the drawing shows a panel heating element, specifically for thermal home appliances which, in the represented embodiment is for an electric range, and thus, a pot is shown thereon in phantom lines. This panel heating element comprises a laminar support element 1, for example, made of high-grade steel or glass ceramic, and an electrically conductive heating layer 2 applied laminarly to support element 1, this heating layer 2 containing glass and has been applied in pasty state.

According to the invention, heating layer 2 consists of powdered molybdenum boride, two different powdered types of glass and an organic substance in a pasty state. In the represented embodiment, an electrically insulating layer 3 is provided between support element 1 and heating layer 2 and heating layer 2 is provided with a protective layer 4 on the side that faces away from support element 1 or insulating layer 3. However, if the support element 1 is made of an electrically nonconductive material, insulating layer 3 may be omitted. Not shown are a pair of electrical terminals that are embedded in the heating layer to apply electrical current to the heating layer which functions, as a whole, as a resistance heating element. The manner in which such electrical terminals are attached and such a heating layer function is known, e.g., from the above-noted published German Application DE 35 45 267 and, thus, need not be described in greater detail.

In an especially preferred embodiment, heating layer 2 consists of 30.0% of molybdenum boride, 35.0% of a first type of glass, 15.0% of a second type of glass and 20% of an organic substance. The first type of glass consists of 28.5% of silicon oxide, 2.0% of aluminum oxide, 16.0% of boron oxide, 10.0% of bismuth oxide, 4.0% of calcium oxide, 34.0% of barium oxide and 5.5% of zinc oxide. The second type of glass is composed of 23.0% of silicon oxide, 9.0% of boron oxide, 9.0% of calcium oxide, 29.0% of magnesium oxide, 19.0% of barium oxide, 4.0% of titanium oxide, 2.5% of manganese oxide, 0.5% phosphorus oxide and 4.0% zirconium oxide. The organic substance consists of 15 parts of lanolin, 3 parts of petrolatum oil and one part of cyclohexanol.

The production of the panel heating element according to the invention takes place in the following steps:

First, the first type of glass—with the components indicated above in detail—is "cooked" at a temperature of 1300° C. in a platinum crucible. Then there follows a processing to granular material, followed by a grinding to a specific surface of 7000 cm$^2$/g. Next, the second type of glass—with the components indicated in detail above—is "cooked" at a temperature of 1400° C. in a corundum crucible. Then there takes place a processing to granular material, then the grinding to a specific surface of 6000 cm$^2$/g. The grinding takes place in several steps, so as to achieve a progressive decrease in the granulate size, and preferably the grinding is performed using a planetary conical grinder.

In the next step the molybdenum boride, the first type of glass, the second type of glass and the organic substance are mixed with a paste grater until a homogeneous paste is present.

A mixture of 80.0% of the second type of glass and 20.0% of the organic substance are used for insulating layer 3, and the organic substance consists of 40.0% of lanolin and 60.0% of petrolatum oil.

Finally, a mixture of 60.0% of the first type of glass, 20.0% of the second type of glass and 20.0% of the organic substance are used for protective layer 4, and the organic substance, like in heating layer 2, consists of 16 parts of lanolin, 3 parts of petrolatum and one part of cyclohexanol.

After the pastes for heating layer 2, insulating layer 3 and protective layer 4 are ready, application to support element 1 and baking are begun. First a first partial layer of insulating layer 3 is applied to support element 1 in a silk-screening process and is baked at a temperature of 850° C. This process is repeated three to four times. Then, heating layer 2 is applied on the insulating layer 3 produced, again in a silk-screening process. Also, heating layer 2 is baked at a temperature of 850° C. Finally, protective layer 4 is applied to heating layer 2, again by a silk-screening process and then baked. The application and baking of protective layer 4 takes place like the application and baking of insulating layer 3, in partial layers, preferably with two to three partial layers. It should be recognized that the heat treatment of the mixtures by baking will cause some components of the paste to vanish by evaporation and the paste mixture to become a hard layer.

The panel heating element according to the invention makes possible a surface-specific heating power of up to 13 W/cm$^2$ and a heating temperature of 800° C. These outstanding properties are achieved without high-grade steel being used so that the panel heating element according to the invention is relatively inexpensive.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. Panel heating element, especially for thermal home appliances, with a laminar support element for supporting an item to be heated and an electrically conductive heating layer applied laminarly to the support element, the heating layer being formed of a material which is a heat treated mixture of a powdered molybdenum boride, two different types of powdered glass and an organic substance; wherein the heating layer consists of 4.0 to 80.0% of molybdenum boride, 9.0 to 48.0% of the first type of glass, 1.0 to 23.0% of the second type of glass and 10.0 to 25.0% of the organic substance; and wherein the first type of glass has softening temperature not exceeding 700° C.

2. Panel heating element according to claim 1, powdered wherein the molybdenum boride is selected from the group consisting of $Mo_2B_5$, $MoB$, or $Mo_2B$.

3. Panel heating element according to claim 1, wherein an electrical insulating layer is provided between the support element and the heating layer.

4. Panel heating element according to claim 3, wherein heating layer is provided with a protective layer on a side which faces away from the support element.

5. Panel heating element according to claim 1, wherein the first type of glass consists of 23.0 to 42.0% of silicon oxide, 1.6 to 8.0 of aluminum oxide, 13.0 to 29% of boron oxide, 5.0 to 16.0% of bismuth oxide, 1.5 to 7.5% of calcium oxide, 25.0 to 43.0% of barium oxide and 1.0 to 11.3% of zinc oxide.

6. Panel heating element according to claim 1, wherein the second type of glass is crystallized, and has an incipient crystallization temperature not exceeding 820° C.

7. Panel heating element according to claim 6, wherein the second type of glass consists of 16.0 to 25.0% of silicon oxide, 5.0 to 25% of boron oxide, 3.0 to 10.0% of calcium oxide, 15.0 to 30.0% of magnesium oxide, 10.0 to 35.0% of barium oxide, 0.5 to 5.0% of titanium oxide, 0.1 to 3.0% of manganese oxide, 0.1 to 5.0% of phosphorus oxide, 0.1 to 12.0% of zirconium oxide and 2.0 to 6.0% of aluminum oxide.

8. Panel heating element according to claim 5, wherein the second type of glass consists of 16.0 to 25.0% of silicon oxide, 5.0 to 25% of boron oxide, 3.0 to 10.0% of calcium oxide, 15.0 to 30.0% of magnesium oxide, 10.0 to 35.0% of barium oxide, 0.5 to 5.0% of titanium oxide, 0.1 to 3.0% of manganese oxide, 0.1 to 5.0% of phosphorus oxide, 0.1 to 12.0% of zirconium oxide and 2.0 to 6.0% of aluminum oxide.

9. Panel heating element according to claim 8, wherein said organic substance comprises a mixture of lanolin and petrolatum oil.

10. Panel heating element according to claim 9, wherein the mixture of which the organic substance is comprised also includes cyclohexanol.

11. Panel heating element according to claim 1, wherein said organic substance comprises a mixture of lanolin and petrolatum oil.

12. Panel heating element according to claim 1, wherein the mixture of which the organic substance is comprised also includes cyclohexanol.

13. Panel heating element according to claim 3, wherein insulating layer is formed of a material that is a heat treated mixture of a powdered glass and the organic substance.

14. Panel heating element according to claim 8, wherein the insulating layer is formed of a material that is a heat treated mixture of 70.0 to 90.0% of the second type of glass and 10.0 to 30.0% of the organic substance, the organic substance preferably consists of 25.0 to 60.0% of lanolin and 40.0 to 75.0% of petrolatum oil.

15. Panel heating element according to claim 4, wherein the protective layer is formed of a material that is a heat treated mixture of the two types of powdered glass and of the organic substance.

16. Panel heating element according to claim 9, wherein a protective layer formed of a material that is a heat treated mixture of 10.0 to 89.0% of the first type of glass, 1.0 to 60.0% of the second type of glass and 10.0 to 30.0% of the organic substance which consists of 15 parts of lanolin, 3 parts of petrolatum oil and one part of cyclohexanol is provided on a side of the heating layer which faces away from the support element.

* * * * *